June 19, 1945.   H. C. HARBERS   2,378,704
SIX WHEEL MOTOR VEHICLE
Filed Feb. 24, 1942   2 Sheets-Sheet 1
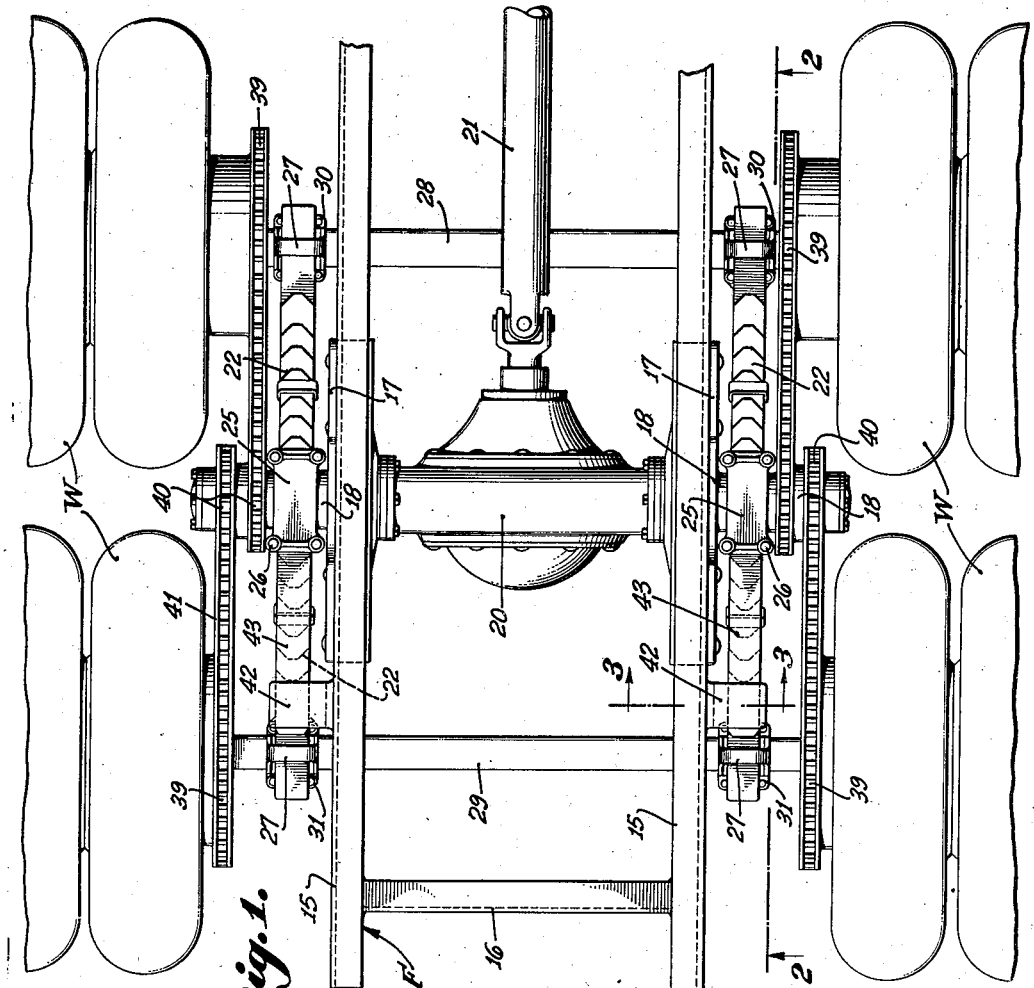
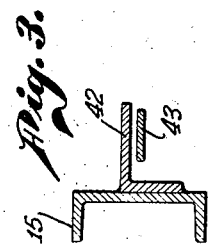
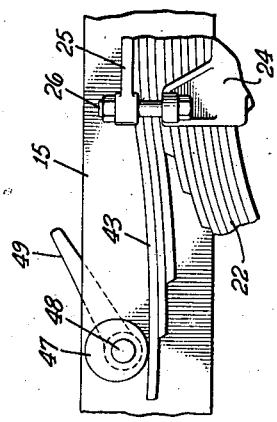
HENRY C. HARBERS,
INVENTOR
BY Edwin D. Jones
ATTORNEY

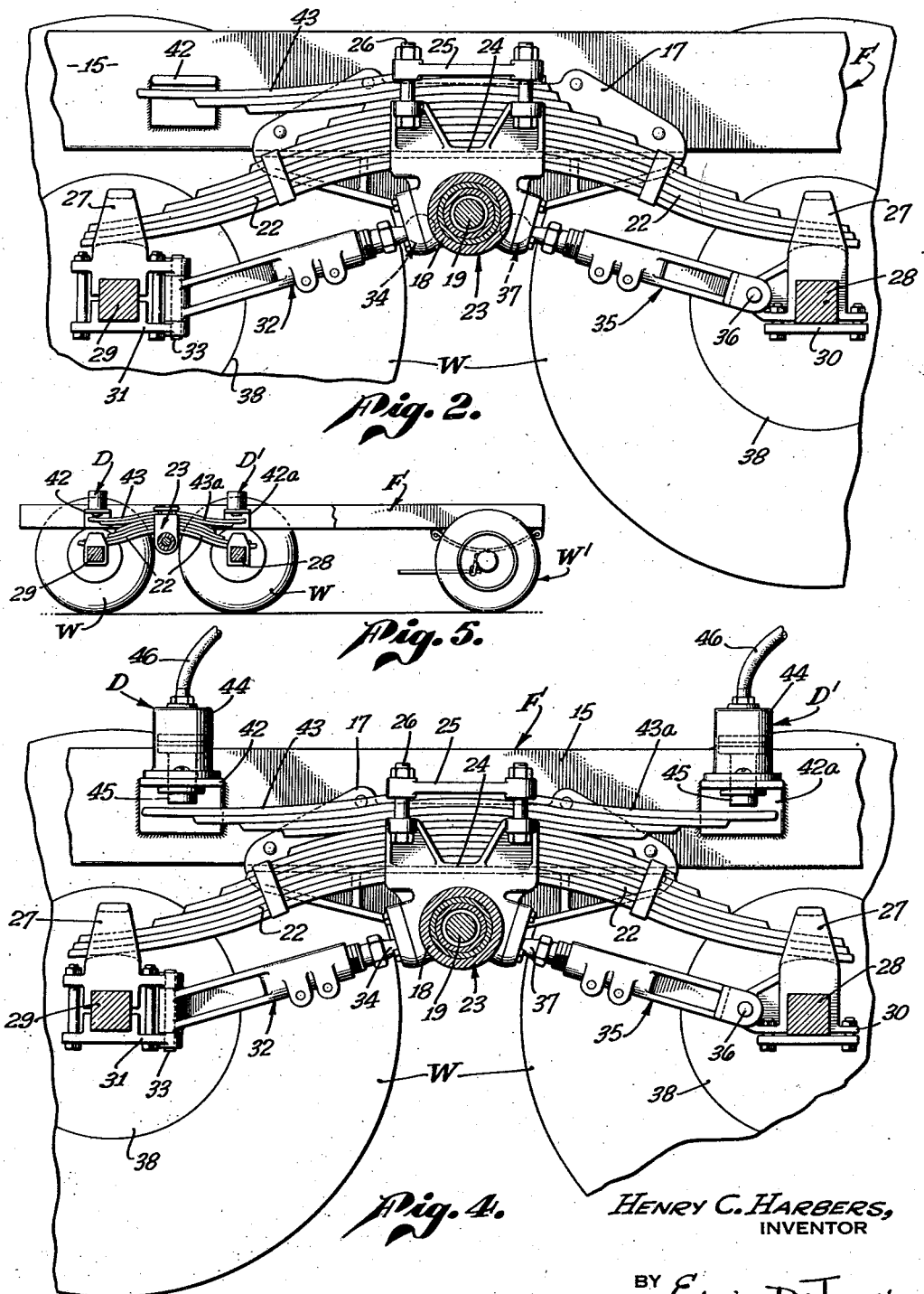

Patented June 19, 1945

2,378,704

UNITED STATES PATENT OFFICE 2,378,704

SIX WHEEL MOTOR VEHICLE

Henry C. Harbers, San Gabriel, Calif., assignor to C. B. Equipment Co., Los Angeles, Calif., a co-partnership Application February 24, 1942, Serial No. 432,113

11 Claims. (Cl. 180—22)

My invention relates to six wheel vehicles, and particularly, although not necessarily, to six wheel motor vehicles having a four wheel driving unit in the form of a truck at the rear end of the vehicle frame, which is suspended by leaf springs pivotally mounted for oscillation to permit free and independent actions of the wheels to compensate for road irregularities, and yet maintaining driving connections with the four wheels of the truck unit and the differential jack shafts, by which latter the wheels are driven through chain and sprocket mechanisms.

As when making brake applications, and traversing extremely uneven ground, the truck unit oscillates excessively, producing detrimental results among which are the following:

The vehicle frame becomes distorted disalining the wheels. The ball and socket connections of the torque and radius rods are frequently broken because of excessive angularity. The stirrups in which the ends of the springs are mounted, are driven between the leaves of the springs throwing the chains of the driving mechanism out of alinement and thereby causing them to climb the sprockets.

It is a purpose of my invention to provide in a motor vehicle of the character described, as well as in a trailer having a non-driven four wheel truck unit, means by which movement of the truck unit in relation to the vehicle frame, can be controlled to prevent sudden and excessive oscillation thereof, and thus eliminate the detrimental results arising therefrom.

Another defect in such oscillatable four wheel truck units, is that the vehicle frame is susceptible of rearward tilting on the truck unit, to cause the front end of the vehicle to raise off of the ground when the vehicle is climbing a steep hill, or when it is embodied in a dump truck and the body of the truck is moved to a dumping position. Also, where the vehicle is traversing level ground and the preponderance or balance of load weight is to the rear of the axis of tilt, the front wheels of the vehicle tend to lift, providing insufficient traction for proper steering particularly at high speeds.

My invention prevents any rearward tilting of the vehicle frame as would set up the disadvantages aforementioned.

In addition, my invention embodies manually controllable means which is operable to intentionally pivot or tilt the vehicle frame on the truck unit, in one direction to increase the load weight on the front wheels of the vehicle, and thereby increase the traction of such wheels to facilitate steering at high speed on paved or hard roads, and in the other direction to decrease the load weight on the front wheels, thus decreasing the traction thereof and facilitating steering in soft ground, as well as to lessen the load weight imposed on the wheels of the truck unit so that they may pass more easily over road obstructions.

My invention provides the further advantage of being operable to lock the truck unit against any oscillation with respect to the vehicle frame. This advantage is highly desirable in crane trucks to prevent any movement of the vehicle frame in relation to the truck unit, during the operation of the boom.

I will describe only two forms of six wheel vehicles, each embodying my invention, and will then point out the novel features thereof in claims.

In the accompanying drawings:

Fig. 1 is a fragmentary plan view of the rear end of a vehicle, embodying my invention.

Fig. 2 is a vertical longitudinal sectional view taken on the line 2—2 of Fig. 1.

Fig. 3 is an enlarged vertical sectional view taken on the line 3—3 of Fig. 1.

Fig. 4 is a view similar to Fig. 2 and showing another form of vehicle embodying my invention.

Fig. 5 is a semi-diagrammatic view showing in longitudinal section a vehicle with the invention of Fig. 4 embodied therein.

Fig. 6 is a fragmentary view showing in side elevation a modified form of pressure exerting device for one yielding abutment of the wheel truck.

Similar reference characters refer to similar parts in each of the several views.

Referring to Figs. 1 to 3, I have shown the rear end of a six wheel vehicle in which the four wheel truck unit for supporting the rear end of the vehicle frame may constitute merely a four wheeled rear support, as in a trailer, or the four wheels of the truck unit may be driven, as in a six wheel motor vehicle by the chain and sprocket mechanism shown in Fig. 1.

The four wheel truck unit is of the type disclosed in U. S. Patent No. 1,773,508, issued August 19, 1930, to A. C. Wollensak. As in that patent, the truck unit is associated with a vehicle frame F comprising two side members 15 in the form of channel beams, connected by a cross member 16. Brackets 17 are secured to the outer sides of the members 15, and these brackets provide supports for a pair of housings 18 containing a pair of jack shafts 19. The housings are bridged by a housing 20 for a differential gearing to which the jack shafts are connected, and propelled from a drive shaft 21.

Two suspension springs 22, of leaf form, are pivotally mounted for oscillation on the housings 18 by means of trunnion hubs 23 which rotatably embrace the housings. These trunnion hubs are formed with saddles 24 in which the springs are clamped by top plates 25 and bolts 26. The ends of the springs 22 are slidably received in stirrups 27 clamped to front and rear axles 28 and 29, respectively, by brackets 30 and 31.

Torque rods 32 are connected to the brackets 31 by pivot pins 33, and to the hubs 23 by ball and socket connections 34. Radius rods 35 are connected to the brackets 30 by pivot pins 36, and to the hubs 23 by ball and socket connections 37.

The axles 28 and 29 have wheels W journaled on each end thereof, and each wheel is provided with a suitable brake 38, the mechanism for operating the latter having been omitted from the drawings as it is conventional. All four wheels W are adapted to be driven by the chain and sprocket mechanism shown in Fig. 1. Each wheel is provided with a sprocket 39 driven from a sprocket 40 by a chain 41. The sprockets 40 are fixed in pairs to the outer ends of the jack shafts 19 where they project from the housings 18.

Manifestly, the four wheel truck unit, as described, is associated with the vehicle frame so as to oscillate about the jack shafts as a center, thereby permitting the wheels to move independently through vertical arcs to compensate for road irregularities. Where the wheels are driven as in the present case, these free and independent wheel actions do not interfere with driving of the wheels by the chain and sprocket mechanism, provided, however the range of oscillation does not exceed certain limits.

Should the truck unit oscillate excessively in a counter-clockwise direction as when viewed in Fig. 2, such as to cause the brackets 30 to swing inwardly about the pins 36 as a center, the stirrups 27 will be driven between the leaves of the springs 22. This causes the chains 41 to be thrown out of alinement and, in consequence, to climb the sprockets. Naturally, under this condition, the driving mechanism becomes jammed, or the chains broken.

Also, should the truck unit oscillate excessively in either direction, the ball and socket connections for the rods 32 and 35 are frequently broken because of the excessive angularities assumed by the rods.

As will be understood, excessive oscillation of the truck unit in either direction may be caused by the truck wheels traversing extremely uneven ground, and in a clockwise direction, as when viewed in Fig. 2, upon a sudden and full brake application.

In the form of my invention shown in Figs. 1 to 3, means is provided for limiting oscillation of the truck unit only in a clockwise direction, and primarily to take care of that excessive angle which the unit so frequently assumes as a result of a brake application. In the present instance, this means comprises two rigid abutments 42 secured to the outer sides of the side frame members 15, and two yielding abutments 43 carried by the springs 22.

The rigid abutments 42 may be in the form of angle bars, and the yielding abutments 43 in the form of spring leaves superimposed on the top leaves of the springs 22 and engaged at one end by the plates 25. At the other end, the longer or top leaves extend beneath the bars 42. Thus, when the truck unit, and more particularly the springs 22, turns in a clockwise direction as when viewed in Fig. 2, the yielding abutments 43 strike the rigid abutments 42 to limit turning movement of the springs 22 to an angle in which the rods 32 and 35 cannot occupy excessive angles, or the stirrups 27 turned to engage between the leaves of the springs 22. Because the abutments 43 are yielding by virtue of the spring leaves flexing when engaging the rigid abutments, swinging movement of the truck unit rearwardly is cushioned to prevent damage to its parts as well as to the angle bars.

In addition to the foregoing advantages, my invention provides the further advantage of resisting tilting movement of the vehicle frame rearwardly on the truck unit, for it will be understood that a pivotal connection between the frame and the unit is provided by the trunnion hubs and the jack shaft housings, which will allow of such tilting. In practice, when the load balance is to the rear of this pivotal connection, or when the vehicle is ascending a relatively steep hill, the tendency of the vehicle frame is to tilt rearwardly and to such extent as to raise the front wheels of the vehicle off of the ground, or to so lessen the weight imposed thereon as to render steering difficult.

The rigid and yielding abutments 42 and 43 of my invention, operate to prevent tilting rearwardly of the vehicle frame on the truck unit to the extent above described, by the rigid abutments engaging the yielding abutments as the rear end of the frame moves downwardly.

Referring now to Figs. 4 and 5, I have here shown another embodiment of my invention which employs two rigid abutments 42a and two yielding abutments 43a, in addition to the abutments 42 and 43 of the first form of my invention. These additional abutments are disposed to the forward side of the axis of oscillation of the truck unit but in the same relative positions thereto as the abutments 42 and 43 to the rear of such axis. The yielding abutments 43 and 43a at each side of the vehicle frame, are made up of the same spring leaves, such leaves being clamped to and extending forwardly and rearwardly from the top of the spring 22 to which they are clamped.

The rigid abutments 42 and 42a are provided with devices D and D1 constituting a manually controllable mechanism by which variable pressures may be exerted downwardly on the yielding abutments 43 and 43a for purposes to be described hereinafter. Each device is in the form of a hydraulic ram the cylinder 44 of which is secured to the angle bar, while the piston rod 45 extends freely through the angle bar for engagement with the adjacent end of the master leaf of the yielding abutment. Manifestly, pressure fluid supplied to the cylinder from a pipe 46 forces the piston rod downwardly against the spring leaf.

The operation of the abutments and the devices D and D1 will be best understood from a consideration of Fig. 5, wherein the front wheels W1 of the vehicle are shown supporting the front end of the frame. As in the first form of my invention, those rigid and yielding abutments at the rear of the axis of oscillation of the truck unit, function to yieldingly limit oscillation of the truck unit in a clockwise direction, while the abutments in advance of the axis of oscillation, perform a like function in the other direction of movement. Thus, oscillation in both directions is at all times limited to prevent excessive oscillation and thereby attain the aforedescribed resultant advantages.

Through operation of the rear devices D, while relieving the front devices of any pressure fluid, downward pressures can be brought to bear on the rear ends of the abutments 43, which reacts to force the vehicle frame upwardly at its rear end and downwardly at its front end. This operates to transfer the balance of weight to the front end of the vehicle, and thereby provides the following advantages:

It resists to a greater degree any tilt of the vehicle frame rearwardly on the truck unit, which makes it admirably suited for dump truck purposes. It tends to lessen the load on the wheels of the truck unit, so that they can pass more easily over road obstructions. It increases the load imposed on the front wheels WI, thus increasing their traction and thereby affording better steering at high speeds on paved highways.

Through operation of the front devices DI, and, at the same time, relieving the devices D of any fluid pressure, downward pressures can be exerted on the front ends of the abutments 43a. This reacts to force the vehicle frame downwardly at its rear end and upwardly at its front end, thereby effecting transfer of the balance of weight to the rear end of the vehicle. This provides the advantage of tending to lift the front wheels of the vehicle, which lessens their traction to facilitate steering in soft ground, and lessens their resistance to passing over road obstructions.

Where pressure fluid is supplied to both sets of devices D and DI simultaneously, oscillation of the truck unit in relation to the vehicle frame, can be partly or completely prevented, depending upon the pressures applied. If it is completely prevented, the truck unit becomes immovable in relation to the vehicle frame, and renders the vehicle suitable for use as a crane truck to prevent tilting of the frame in any direction under the loads handled by the boom.

In Fig. 6, I have shown another form of device four of which may be used in place of the rams D and DI to accomplish the same functions. This device comprises a cam 47 fixed to a shaft 48 journaled in the side frame member 15, and rotatable by an arm 49 to move the high point of the cam downwardly to depress the yielding abutment 43 and lift the vehicle frame after the abutment has been fully depressed.

Although I have herein shown and described only two forms of vehicles, and two forms of devices, each embodying my invention, it is to be understood that various changes and modifications may be made therein without departing from the spirit of my invention and the spirit and scope of the appended claims.

I claim:

1. In a motor vehicle; a frame; differential drive shafts carried by said frame; axles at opposite sides of said shafts; stirrups fixed to said axles; leaf springs pivotally mounted coaxially with said shafts and engaging said stirrups; wheels carried by said axles; chain and sprocket connections between said shafts and said wheels; brakes for said wheels; and means for limiting pivotal movement of said springs in that direction which they rotate as a result of a brake application.

2. In a motor vehicle; a frame; differential drive shafts carried by said frame; axles at opposite sides of said shafts; springs pivotally mounted on said frame coaxially with said shafts and engaging said axles; wheels on said axles; a driving connection between said wheels and said shafts; and yieldable means for limiting pivotal movement of said springs on said frame.

3. In a motor vehicle; a frame; differential drive shafts carried by said frame; axles at opposite sides of said shafts; stirrups fixed to said axles; leaf springs pivotally mounted coaxially with said shafts and engaging said stirrups; wheels carried by said axles; chain and sprocket connections between said shafts and said wheels; brakes for said wheels; and means for limiting pivotal movement of said springs in that direction which they rotate as a result of a brake application, said means comprising rigid abutments on said frame, and yielding abutments secured to said springs and engageable with said rigid abutments.

4. In a motor vehicle; a frame; differential drive shafts carried by said frame; axles at opposite sides of said shafts; springs pivotally mounted on said frame coaxially with said shafts and engaging said axles; wheels on said axles; a driving connection between said wheels and said shafts; brakes for said wheels; and means for limiting pivotal movement of said springs in that direction which they rotate as a result of applying said brakes, said means comprising rigid abutments on said frame; and spring leaves secured to said springs and positioned to be engaged by said abutments.

5. In a vehicle; a four-wheel truck; a frame mounted at its rear end on said truck to pivot about an axis transversely of the frame; and means on said frame for applying pressure downward on said truck to one side or the other of said axis, whereby the preponderance of weight of said frame may be shifted to one side or the other of said axis.

6. In a vehicle; a four-wheel truck; a frame mounted at its rear end on said truck to pivot about an axis transversely of the frame; and means on said frame for applying pressure downward on said truck to the rear side or the front side of said axis tending to lower or lift the front end of said frame.

7. In a vehicle; a four-wheel truck; a frame mounted at its rear end on said truck to pivot about an axis transversely of the frame; and hydraulic means on said frame for applying pressure downward on said truck to one side or the other of said axis, whereby the preponderance of weight of said frame may be shifted to one side or the other of said axis.

8. In a vehicle; a four-wheel truck; a frame mounted at its rear end on said truck to pivot about an axis transversely of the frame; and cam means on said frame for applying pressure downward on said truck to the rear or front side of said axis tending to lower or lift the front end of said frame.

9. In a vehicle; a four-wheel truck; a frame mounted at its rear end on said truck to pivot about an axis transversely of the frame; rigid abutments secured to said frame and positioned forwardly and rearwardly of said axis; yielding abutments secured to said truck and positioned forwardly and rearwardly of said axis, to coact with said rigid abutments in limiting pivotal movements of said truck and said frame relatively in either direction; and devices carried by said rigid abutments and operable to engage said yielding abutments and exert variable pressures downwardly on the yielding abutments.

10. In a vehicle: a frame; a truck comprising a pair of axles transversely of said frame and spaced longitudinally thereof, a pair of supporting wheels carried by each of said axles, a pair of springs mounted between their ends on said frame for pivotal movement about an axis transversely of the frame, and at their ends engaging said axles, whereby the truck as a unit is oscillatable on said frame about said transverse axis, and said frame is tiltable on said truck about the same axis, and cooperative means in association with said frame and said truck so constructed and arranged as to control oscillation of said truck and tilting of said frame on the truck.

11. In a vehicle: a frame; a four wheel truck pivotally mounted on said frame about an axis transversely thereof; and devices on said frame at opposite sides of the said axis independently operable to exert variable pressures downwardly on said truck to regulate or prevent pivotal movement of said truck about said axis.

HENRY C. HARBERS.